(12) United States Patent
Ruebenacker et al.

(10) Patent No.: US 11,578,167 B2
(45) Date of Patent: Feb. 14, 2023

(54) SULPHUR-CONTAINING POLYESTER POLYOLS, THEIR PRODUCTION AND USE

(71) Applicant: BASF SE, Ludwigshafen am Rhein (DE)

(72) Inventors: Martin Ruebenacker, Ludwigshafen (DE); Kathrin Cohen, Ludwigshafen (DE); Sirus Zarbakhsh, Ludwigshafen (DE); Sindhu Menon, Singapore (SG); Sabrina Kronig, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 387 days.

(21) Appl. No.: 16/618,654

(22) PCT Filed: Jul. 3, 2018

(86) PCT No.: PCT/EP2018/067895
§ 371 (c)(1),
(2) Date: Dec. 2, 2019

(87) PCT Pub. No.: WO2019/007937
PCT Pub. Date: Jan. 10, 2019

(65) Prior Publication Data
US 2021/0095072 A1    Apr. 1, 2021

(30) Foreign Application Priority Data
Jul. 5, 2017 (EP) ..................................... 17179783

(51) Int. Cl.
| | |
|---|---|
| *C08G 63/688* | (2006.01) |
| *C08G 18/22* | (2006.01) |
| *C08G 18/40* | (2006.01) |
| *C08G 18/42* | (2006.01) |
| *C08G 18/46* | (2006.01) |
| *C08G 18/76* | (2006.01) |
| *C08J 9/14* | (2006.01) |

(52) U.S. Cl.
CPC ....... *C08G 63/6886* (2013.01); *C08G 18/225* (2013.01); *C08G 18/4018* (2013.01); *C08G 18/4202* (2013.01); *C08G 18/423* (2013.01); *C08G 18/4676* (2013.01); *C08G 18/7664* (2013.01); *C08J 9/142* (2013.01); *C08G 2110/0025* (2021.01); *C08J 2203/12* (2013.01); *C08J 2205/10* (2013.01)

(58) Field of Classification Search
CPC ...... C08G 18/14; C08G 18/163; C08G 18/18; C08G 18/225; C08G 18/4018; C08G 18/4202; C08G 18/423; C08G 18/4676; C08G 18/7664; C08G 63/6886; C08G 2110/0025; C08J 9/142; C08J 2203/12; C08J 2205/10
See application file for complete search history.

(56) References Cited

U.S. PATENT DOCUMENTS

| | | |
|---|---|---|
| 3,267,050 A | 8/1966 | Kuryla et al. |
| 3,304,273 A | 2/1967 | Stamberger |
| 3,383,351 A | 5/1968 | Stamberger |
| 3,459,787 A | 8/1969 | Weesner |
| 3,523,093 A | 8/1970 | Stamberger |
| 3,892,686 A | 7/1975 | Woo |
| 4,304,708 A | 12/1981 | Marx et al. |
| 4,374,209 A | 2/1983 | Rowlands |
| 4,426,512 A | 1/1984 | Barbee et al. |
| 4,699,972 A | 10/1987 | Hammer et al. |
| 5,532,284 A | 7/1996 | Bartlett et al. |
| 5,552,512 A | 9/1996 | Sublett |
| 6,403,231 B1 | 6/2002 | Mueller et al. |
| 6,727,052 B1 | 4/2004 | Rao |
| 6,790,916 B2 | 9/2004 | Braeuer et al. |
| 7,144,972 B2 | 12/2006 | Hayes |
| 8,158,726 B2 | 4/2012 | Rappoport et al. |
| 9,353,234 B2 * | 5/2016 | Jacobmeier ........ C08G 18/6688 |
| 2003/0003302 A1 | 1/2003 | Fahey et al. |
| 2012/0202083 A1 | 8/2012 | Shiomi et al. |
| 2014/0197359 A1 | 7/2014 | Chi et al. |
| 2015/0218428 A1 | 8/2015 | Krishnan et al. |
| 2016/0060480 A1 * | 3/2016 | Mody ................. C08G 63/199 524/604 |
| 2018/0030202 A1 * | 2/2018 | Tabor ................ C08G 63/6886 |
| 2019/0300642 A1 * | 10/2019 | Ahmadloo ............. C08J 9/125 |
| 2021/0277178 A1 * | 9/2021 | Letko ................ C08G 63/6886 |

FOREIGN PATENT DOCUMENTS

| | | |
|---|---|---|
| CN | 1198755 A | 11/1998 |
| CN | 762328 A | 4/2006 |
| CN | 1980976 A | 6/2007 |
| CN | 102432849 A | 5/2012 |
| CN | 102597104 A | 7/2012 |
| CN | 103923440 A | 7/2014 |
| CN | 104822728 A | 8/2015 |
| CN | 105196653 A | 12/2015 |

(Continued)

OTHER PUBLICATIONS

International Search Report dated Oct. 9, 2018 in PCT/EP2018/067895 filed on Jul. 3, 2018, 2 pages.
U.S. Appl. No. 16/620,936, filed Dec. 10, 2019, Martin Ruebenacker.
Extended European Search Report dated Dec. 22, 2017 in Patent Application No. 17179783.0 (with English translation of categories of cited references).
Svanström, M. et al. "A Method for Analysing the Gas Phase in Polyurethane Foam" Journal of Cellular Plastics, vol. 31, No. 4, Jul. 1995, 18 pages.
Anantharaj, et al., "Melt polycondensation approach for reduction degradable helical polyester based on l-cysteine", Journal of Polymer Science Part A: Polymer Chemistry, vol. 54, Issue 18, Jun. 29, 2016, pp. 2864-2875.
Joseph, et al., "Synthesis and characterization of polyesters containing sulphide, sulphone or carbonyl groups in their backbones", European Polymer Journal, vol. 29, Issue 12, Dec. 1993, pp. 1641-1645.

*Primary Examiner* — John M Cooney
(74) *Attorney, Agent, or Firm* — Grüneberg and Myers PLLC

(57) ABSTRACT

The present invention relates to sulfur-containing polyester polyols and to the preparation and use thereof.

12 Claims, No Drawings

(56) References Cited

FOREIGN PATENT DOCUMENTS

| | | |
|---|---|---|
| CN | 105199652 A | 12/2015 |
| CN | 106397755 A | 2/2017 |
| DE | 1 111 394 | 7/1961 |
| DE | 1 152 536 | 8/1963 |
| DE | 1 152 537 | 8/1963 |
| DE | 1 215 373 | 4/1966 |
| DE | 1 222 669 | 8/1966 |
| DE | 32 31 497 A1 | 3/1984 |
| EP | 0 011 752 B1 | 2/1984 |
| EP | 0 213 565 A2 | 3/1987 |
| GB | 987618 | 3/1965 |
| GB | 1040452 | 8/1966 |
| JP | 2011-190329 A | 9/2011 |

\* cited by examiner

SULPHUR-CONTAINING POLYESTER POLYOLS, THEIR PRODUCTION AND USE

The present invention relates to sulfur-containing polyester polyols (PESOLs) and to the preparation and use thereof.

In the context of the present disclosure, the terms "polyester polyol" and the abbreviation "PESOL" are used synonymously and refer to a compound having at least two reactive OH groups and at least two, preferably more than two, ester bonds.

The barrier properties of polyurethane systems, for example insulating foams or thermoplastic polyurethane (PU), are determined by the structure of the polymer matrix in particular. Reduced thermal conductivity and lower gas diffusion can thus be achieved only when the polymer matrix has particularly low gas permeabilities. For this purpose, it was necessary to develop new polyol structures that reduce the gas permeability of polyurethane materials, particularly with respect to the gases carbon dioxide, nitrogen, oxygen, water, methane and pentane derivatives.

The use of polyurethanes in which a good gas barrier is required is limited by the high permeability of the polyurethane matrix. It is therefore desirable to produce polyurethanes having a high barrier to gases such as $CO_2$, $O_2$, $H_2O$ and $N_2$. Furthermore, the thermal conductivity of polyurethane foams can also be distinctly improved by increasing the gas barrier. (U.S. Pat. No. 5,532,284)

Known methods of producing polyurethanes with high barrier properties are, for example, formulation with nanoscale fillers in order to extend diffusion pathways. Prior applications describe here the use of nanoscale clay, for example (U.S. Pat. No. 6,403,231). Such methods entail the handling of solids, which distinctly complicate processing and cause a sharp increase in viscosity.

Furthermore, U.S. Pat. No. 5,532,284 states that polymers such as ethylene/vinyl acetate copolymer or ethylene/acrylic ester copolymer, which are known for a high gas barrier, can distinctly lower the thermal conductivity of polyurethane systems. This is attributable to lower cell gas diffusion. By means of this method, it is possible to effectively increase the gas barrier, but it is first necessary to produce a stable dispersion of the barrier polymer in the continuous polymer phase. This entails a further process step. It is therefore desirable to produce polyurethane systems which have a high barrier but do not need a further process step.

This can be achieved by the present invention by preparing sulfur-containing polyester polyols.

Poly(thio)ester polyols can be prepared in various ways, for example by condensation of di(hydroxyethyl) polysulfides. U.S. Pat. No. 8,158,726 describes the preparation of hydroxy- and carboxy-functional polyesters, for example by reacting di(hydroxyethyl) disulfide with a mono- or dibasic carboxylic acid in the presence of a protic acid catalyst, and their use in polyurethane prepolymers based on the aforementioned compounds. However, no polysulfidic dicarboxylic acids are used here. Moreover, the protic catalyst used is preferably a strong acid, for example methanesulfonic acid. This results in increased formation of unwanted cyclic by-products.

Sulfur-containing dicarboxylic acids have the advantage of elevated reactivity with respect to esterification owing to the activation of the COOH groups. It is thus possible according to the present invention, through the use of sulfur-containing dicarboxylic acids, to obtain polyester polyols that can be prepared without addition of a catalyst.

While U.S. Pat. No. 8,158,726 describes the synthesis of prepolymers, no properties of the resulting polyurethane materials are described.

Prior applications describe the preparation and properties of high molecular weight polyesters based on the diacids 2-[4-[4-(carboxymethoxy)phenyl]sulfanylphenoxy]acetic acid, 2-[4-[4-(carboxymethoxy)phenyl]sulfonylphenoxy] acetic acid and terephthalic acid with ethylene glycol. The polyesters prepared in the synthesis described, in which transition metal catalysts are used, can be processed by extrusion to give materials having an elevated oxygen barrier (U.S. Pat. No. 4,426,512). However, the structures described are each aromatic thioethers which have an improved barrier property through the combination of sulfur and aromatic carboxylic acids. In the case of aromatic compounds, it is to be expected that the barrier properties will be improved owing to the "pi-stacking" effect, but this cannot be predicted for aliphatic compounds.

Nor has there been any description to date in the literature to the effect that disulfidic aliphatic compounds such as diacids (e.g. 3,3-dithiodipropionic acid, also called 3-(2-carboxyethyldisulfanyl)propionic acid (CAS 1119-62-9), can nevertheless likewise have improved barrier properties through skillful combination, for example with glycols.

Sulfur-based foams as described in U.S. Pat. No. 3,892,686 were preparable by reaction of aromatic dicarboxylic acids or heterocycles with elemental sulfur. Aromatic polysulfides are thus obtained. The use of dithiodipropionic acid is described in this publication only as an additive. Furthermore, no statements were made as to the resulting properties of the foams either.

Further relevant literature describes the preparation of sulfur-containing polyesters (U.S. Pat. No. 3,459,787) based on monothio- and dithiocarboxylic acids by means of catalyzed esterification with lead oxide, for example. The use of cyclohexanedimethanol is not disclosed. The resulting polymers are polyesterols having a molecular weight of 2000 to 10,000 g/mol, and some have been processed further by heating with elemental sulfur and tested for their properties, e.g. crystallinity and viscosity. However, there has been no description of use of these products in polyurethane applications.

There was therefore a desire in the specialist field to produce polyurethane systems based on polyester polyols that result in an improved gas barrier. The polyester polyols were to be preparable here in a very simple manner, for example without use of an additional catalyst, and a minimum level of by-products was to be formed.

It has now been found that, surprisingly, methods including reaction of dithiodipropionic acid with cyclohexanedimethanol and optionally further polyols give rise to polymers that lead to an improvement in the gas barrier in polyurethane materials systems and hence reduce thermal conductivity, it being possible to dispense with the addition of a catalyst for the preparation of the polyester polyols.

It is assumed that the sulfur-containing dicarboxylic acid as reactant simultaneously also has a catalytic effect on the reaction with the alcohol.

Therefore, in a preferred embodiment of the invention, no further catalyst is used. By dispensing with an additional, e.g. protic, (acid) catalyst, the number and amount of unwanted by-products in the PESOL product are also reduced.

The present invention thus provides a polyester polyol comprising the esterification product of:
a. at least one dicarboxylic acid component (A), where the dicarboxylic acid component (A) comprises
b. at least one disulfide-containing dicarboxylic acid a-1; and
c. a polyol component (K) comprising
   i. at least one diol (D), where the diol (D) comprises
   ii. at least one diol b-1 selected from the group consisting of cyclohexanedimethanol and hexane-1,6-diol.

Preference is given here to using 45-50 mol % of the dicarboxylic acid component A) and 50-55% of a polyol component (K), where the sum total of the molar percentages of A and K is 100 mol %.

It is possible here, in one embodiment of the present invention, that the dicarboxylic acid component A) also comprises at least one non-sulfur-containing dicarboxylic acid a-2. Preferably, in this embodiment, the dicarboxylic acid component A) comprises
a. 50 to 100 mol % of at least one disulfide-containing dicarboxylic acid a-1; and
b. 0-50 mol % of a non-sulfur-containing dicarboxylic acid a-2,
where the sum total of the molar percentages of components a-1 and a-2 in the dicarboxylic acid component A) is 100 mol %.

Examples of useful non-sulfur-containing dicarboxylic acid a2 include: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids a-2 may be used either individually or else in a mixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides such as phthalic anhydride. Aromatic dicarboxylic acids used are preferably phthalic acid, terephthalic acid and/or isophthalic acid in a mixture or alone. Aliphatic dicarboxylic acids used are preferably dicarboxylic acid mixtures of succinic acid, glutaric acid and adipic acid. The mixtures may be used here in quantitative ratios of, for example, 20 to 35:35 to 50:20 to 32 parts by weight, and adipic acid in particular may be used.

Very particular preference is given to using phthalic acid and terephthalic acid as non-sulfur-containing dicarboxylic acid a-2.

In one embodiment of the present invention, at least one, preferably all, of the at least one disulfide-containing dicarboxylic acids a-1) are selected from the group consisting of aliphatic disulfide-containing dicarboxylic acids.

In one embodiment of the present invention, at least one of the disulfide-containing dicarboxylic acids a-1), preferably all of the disulfide-containing dicarboxylic acids a-1), are selected from the group consisting of 3,3-dithiodipropionic acid, 2-(carboxymethyldisulfanyl)acetic acid, 3-(2-carboxyethyldisulfanyl)propanoic acid, 4-(3-carboxypropyldisulfanyl)butanoic acid, and their alkyl esters, preferably dimethyl and diethyl esters, and mixtures of the aforementioned dicarboxylic acids.

In a particularly preferred embodiment, dicarboxylic acid component A) consists of just one disulfide-containing dicarboxylic acid, this disulfide-containing dicarboxylic acid being 3-(2-carboxyethyldisulfanyl)propanoic acid (3,3-dithiodipropionic acid).

The diol component D may, as well as the diol b-1), comprise a further diol b-2. The diol b-2 is preferably selected from the group consisting of ethylene glycol, diethylene glycol, propane-1,2-diol, propane-1,3-diol, monopropylene glycol, dipropylene glycol, butane-1,4-diol, pentane-1,5-diol, or mixtures of the aforementioned components.

The diol component D) here comprises
a. 10 mol % to 100 mol % of diol b-1;
b. 0 mol % to 90 mol % of diol b-2,
   where the sum total of the molar percentages of components b-1 and b-2 is 100 mol %.

In a further embodiment of the present invention, component b-1) is the sole diol component D. In a preferred embodiment of the present invention, component b-1) is cyclohexane-1,4-dimethanol.

In a further embodiment of the present invention, at least one polyhydric alcohol C is present in the polyol component K, preferably exactly one polyhydric alcohol C), the polyhydric alcohol C having a functionality of greater than 2.

Preferably, in this embodiment, polyol component (K) comprises
a. 10 to 100 mol % of the diol (D); and
b. 0 to 90 mol % of at least one polyhydric alcohol C) having a functionality greater than 2.

The polyol component (K) more preferably comprises the polyhydric alcohol C) in an amount of 0.1 to 40 mol %, preferably 0.2 to 30 mol %, more preferably 0.5 to 10 mol %, based on the sum total of all alcohols present in the polyol component (K).

In one embodiment of the present invention, the polyhydric alcohol C) is selected from the group of glycerol, trimethylolpropane (TMP), pentaerythritol, mixtures of the aforementioned compounds and alkylene oxides of the aforementioned compounds.

Alkylene oxides in the context of the present invention are preferably ethylene oxide, propylene oxide or butylene oxide, preferably ethylene oxide or propylene oxide.

In a preferred embodiment of the present invention, the polyhydric alcohol C) is prepared by reacting a polyol selected from the group consisting of the group of glycerol, trimethylolpropane (TMP), pentaerythritol with ethylene oxide and/or propylene oxide, preferably ethylene oxide.

In a further preferred embodiment of the present invention, the polyhydric alcohol C) consists of the reaction product of TMP with ethylene oxide.

In one embodiment of the present invention, the polyhydric alcohol C) has an OH number in the range from 1800 mg KOH/g to 100 mg KOH/g, preferably 1400 mg KOH/g to 150 mg KOH/g, more preferably 1250 mg KOH/g to 200 mg KOH/g.

In a preferred embodiment of the present invention, the polyhydric alcohol C) consists of TMP.

In a preferred embodiment of the present invention, the polyhydric alcohol C) consists of the reaction product of trimethylolpropane (TMP) or glycerol with ethylene oxide and/or propylene oxide, preferably ethylene oxide, TMP.

A particularly preferred embodiment of the invention is a polyester polyol consisting of the esterification product of i) 45-50 mol% of the dicarboxylic acid component (A) comprising 3-(2-carboxyethyldisulfanyl)propanoic acid and ii) 50-55% of a polyol component (K) comprising cyclohexane-1,4-dimethanol, where the molar percentages of components i) and ii) add up to 100%.

A further preferred embodiment of the invention is a polyester polyol consisting of the esterification product of a) 10 to 70 mol % of 3-(2-carboxyethyldisulfanyl)propanoic acid and b) 10 to 70 mol % of cyclohexane-1,4-dimethanol, where the molar percentages of components i) and ii) add up to 100%, and where no additional catalyst is used in the esterification.

A further particularly preferred embodiment of the invention is a polyester polyol consisting of the esterification product of i) 45 to 55 mol % of 3-(2-carboxyethyldisulfanyl)propanoic acid, ii) 50 to 55% of a polyol component K consisting of b-1) 10 to 70 mol % of cyclohexane-1,4-dimethanol and
c) 0.5 to 20 mol % of trimethylolpropane, where the molar percentages of components a) to c) add up to 100%.

A further particularly preferred embodiment of the invention is a polyester polyol consisting of the esterification product of i) 45 to 55 mol % of 3-(2-carboxyethyldisulfanyl)propanoic acid, ii) 50 to 55% of a polyol component K consisting of b-1) 10 to 70 mol % of cyclohexane-1,4-dimethanol and
c) 0.5 to 20 mol % of trimethylolpropane, where the molar percentages of components a) to c) add up to 100% and no additional catalyst is used in the esterification.

The present invention also further provides a process for preparing a polyester polyol by reacting the dicarboxylic acid component (A) as defined above in the amounts specified above with the polyol component (K).

The polyester polyols of the invention are prepared by polycondensing the disulfide-containing polycarboxylic acids and/or derivatives and polyhydric alcohols, preferably without catalyst, appropriately in an atmosphere of inert gas, for example nitrogen, carbon monoxide, helium, argon inter alia, in the melt at temperatures of 150 to 220° C., preferably 160 to 190° C., optionally under reduced pressure, up to the desired acid number, which is advantageously less than 10, preferably less than 2. In a preferred embodiment, the esterification mixture is polycondensed at the abovementioned temperatures up to an acid number of 80 to 20, preferably 40 to 20, under standard pressure and then under a pressure of less than 500 mbar, preferably 40 to 400 mbar. The resultant polyester polyols preferably have a functionality of 1.8 to 4, especially 2 to 3, and a molecular weight of 300 to 3000, preferably 400 to 2500 and especially 450 to 2000.

A further embodiment of the process comprises a variant in which no additional catalyst is used for preparation of a polyester polyol of the invention.

Some suitable sulfur-containing reactants (dicarboxylic acids) that can each be reacted with an appropriate reactant in accordance with the invention are shown in schematic form further below as chemical formulae purely for illustration.

In addition, the invention also relates to the use of the polyester polyols of the invention or preparable in accordance with the invention for preparation of a polyurethane by reaction with at least one di- or polyisocyanate and at least one aliphatic diol and optionally at least one blowing agent.

The invention especially relates to the use of the polyester polyols of the invention in rigid polyurethane foams.

The present invention therefore also encompasses a process for producing a rigid polyurethane foam by converting a reaction mixture comprising
A. organic and/or modified organic di- and/or polyisocyanates with
B. the specific polyester polyols of the invention,
F. one or more blowing agents; and
G. catalysts.

In a further embodiment, the reaction mixture here may additionally
C. further polyester polyols and/or
D. optionally polyetherols and/or further compounds having at least two isocyanate-reactive groups and/or
E. and optionally chain extenders and/or crosslinking agents and/or
H. optionally further auxiliaries and/or additives, and/or
I. optionally at least one flame retardant and/or
J. optionally with foam stabilizers.

Accordingly, the invention especially relates to the use of the polyester polyols of the invention in rigid polyurethane foams produced from:
A. organic and/or modified organic di- and/or polyisocyanates with
B. the specific polyester polyols of the invention,
C. optionally further polyester polyols,
D. optionally polyetherols and/or further compounds having at least two isocyanate-reactive groups,
E. and optionally chain extenders and/or crosslinking agents,
F. one or more blowing agents,
G. catalysts, and
H. optionally further auxiliaries and/or additives, and
I. optionally at least one flame retardant.

It is optionally possible here to use foam stabilizers (J).

For production of the rigid polyurethane foams by the process of the invention, as well as the specific polyester polyols described above, the formation components known per se are employed, specific details of which follow hereinafter.

Useful organic and/or modified organic polyisocyanates A) include the aliphatic, cycloaliphatic, araliphatic and preferably the aromatic polyfunctional isocyanates that are known per se.

Specific examples include: alkylene diisocyanates having 4 to 12 carbon atoms in the alkylene radical, such as dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, and preferably aromatic di- and polyisocyanates, for example tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,2'-diisocyanates, polyphenylpolymethylene polyisocyanates, mixtures of diphenylmethane 2,4'-, 2,4'- and 2,2'-diisocyanates and polyphenylpolymethylene polyisocyanates (crude MDI) and mixtures of crude MDI and tolylene diisocyanates.

The organic diisocyanates and polyisocyanates can be used individually or in the form of their mixtures.

Preferred di- and polyisocyanates are tolylene diisocyanate (TDI), diphenylmethane diisocyanate (MDI) and especially mixtures of diphenylmethane diisocyanate and polyphenylene polymethylene polyisocyanates (polymeric MDI or PMDI).

What are called modified polyfunctional isocyanates are also frequently used, i.e. products which are obtained by chemical reaction of organic di- and/or polyisocyanates. Examples include di- and/or polyisocyanates comprising ester, urea, biuret, allophanate, carbodiimide, isocyanurate, uretdione, carbamate and/or urethane groups. For production of rigid polyurethane foams, very particular preference is given to using polymer MDI.

Suitable further polyester polyols C) may be prepared, for example, from organic dicarboxylic acids having 2 to 12 carbon atoms, preferably aromatic dicarboxylic acids or a mixture of aromatic and aliphatic dicarboxylic acids, and polyhydric alcohols, preferably diols, having 2 to 12 carbon atoms, preferably 2 to 6 carbon atoms. Examples of useful dicarboxylic acids include: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids may be used here either individually or in a mixture with one another. Instead of the free dicarboxylic acids it is also possible to use the corresponding dicarboxylic acid derivatives, for example dicarboxylic esters of alcohols having 1 to 4 carbon atoms or dicarboxylic anhydrides such as phthalic anhydride. Aromatic dicarboxylic acids used are preferably phthalic acid, terephthalic acid and/or isophthalic acid in a mixture or alone. Aliphatic dicarboxylic acids used are preferably dicarboxylic acid mixtures of succinic acid, glutaric acid and adipic acid in quantitative proportions of, for example, 20 to 35:35 to 50:20 to 32 parts by weight, and especially adipic acid. Examples of di- and polyhydric alcohols, especially diols, are: ethanediol, diethylene glycol, propane-1,2- and -1,3-diol, dipropylene glycol, butane-1,4-diol, pentane-1,5-diol, hexane-1,6-diol, decane-1,10-diol, glycerol, trimethylolpropane and pentaerythritol. It is preferable to use ethanediol, diethylene glycol, butane-1,4-diol, pentane-1,5-diol, hexane-1,6-diol or mixtures of at least two of the diols mentioned, in particular mixtures of butane-1,4-diol, pentane-1,5-diol and hexane-1,6-diol. It is also possible to use polyester polyols composed of lactones, for example c-caprolactone, or hydroxycarboxylic acids, for example ω-hydroxycaproic acid.

It is also possible to use polyether polyols D) that are prepared from one or more alkylene oxides having 2 to 4 carbon atoms in the alkylene radical by known processes, for example by anionic polymerization with alkali metal hydroxides, for example sodium or potassium hydroxide, or alkali metal alkoxides, for example sodium methoxide, sodium or potassium ethoxide or potassium isopropoxide, as catalysts and with addition of at least one starter molecule comprising 2 to 8, preferably 2 to 6, reactive hydrogen atoms in bonded form, or by cationic polymerization with Lewis acids, such as antimony pentachloride, boron fluoride etherate inter alia or fuller's earth as catalysts.

Suitable alkylene oxides are for example tetrahydrofuran, 1,3-propylene oxide, 1,2- and 2,3-butylene oxide, styrene oxide and preferably ethylene oxide and 1,2-propylene oxide. The alkylene oxides can be used individually, alternately in succession or as mixtures. Preferred alkylene oxides are propylene oxide and ethylene oxide; particular preference is given to ethylene oxide. Examples of useful starter molecules include: water, organic dicarboxylic acids such as succinic acid, adipic acid, phthalic acid and terephthalic acid, aliphatic and aromatic, optionally N-monoalkyl- and N,N- and N,N'-dialkyl-substituted diamines having 1 to 4 carbon atoms in the alkyl radical, such as optionally mono- and dialkyl-substituted ethylenediamine, diethylenetriamine, triethylenetetramine, propylene-1,3-diamine, butylene-1,3- or 1,4-diamine, hexamethylene-1,2-, -1,3-, -1,4-, -1,5- and -1,6-diamine, phenylenediamines, tolylene-2,3-, -2,4- and -2,6-diamine and 4,4'-, 2,4'- and 2,2'-diaminodiphenylmethane.

Useful starter molecules further include: alkanolamines, for example ethanolamine, N-methyl- and N-ethylethanolamine, dialkanolamines, for example diethanolamine, N-methyl- and N-ethyldiethanolamine, and trialkanolamines, for example triethanolamine, and ammonia. Preference is given to using di- or polyhydric alcohols, such as ethanediol, propane-1,2- and -1,3-diol, diethylene glycol, dipropylene glycol, butane-1,4-diol, hexane-1,6-diol, glycerol, trimethylolpropane, pentaerythritol, sorbitol and sucrose.

The polyether polyols, preferably polyoxypropylene polyols and/or polyoxyethylene polyols, have a functionality of preferably 2 to 6 and especially 2 to 5 and molecular weights of 150 to 3000, preferably 200 to 2000 and especially 250 to 1000.

Further suitable polyether polyols are polymer-modified polyether polyols, preferably graft polyether polyols, especially those based on styrene and/or acrylonitrile, which are prepared by in situ polymerization of acrylonitrile, styrene or preferably mixtures of styrene and acrylonitrile, for example in a weight ratio of 90:10 to 10:90, preferably 70:30 to 30:70, appropriately in the aforementioned polyether polyols analogously to the details in German patent specifications 11 11 394, 12 22 669 (U.S. Pat. Nos. 3,304,273, 3,383,351, 3,523,093), 11 52 536 (GB 10 40452) and 11 52 537 (GB 987,618), and also polyether polyol dispersions which comprise as disperse phase, typically in an amount of 1% to 50% by weight, preferably 2% to 25% by weight, for example, polyureas, polyhydrazides, polyurethanes comprising bound tertiary amino groups, and/or melamine, and which are described, for example, in EP-B 011 752 (U.S. Pat. No. 4,304,708), U.S. Pat. No. 4,374,209 and DE-A,32 31 497.

The polyether polyols, just like the polyester polyols, may be used individually or in the form of mixtures. In addition, they may be mixed with the graft polyether polyols or polyester polyols, and with the hydroxyl group-containing polyester amides, polyacetals, polycarbonates and/or polyether polyamines.

Examples of useful hydroxyl group-containing polyacetals include the compounds preparable from glycols such as diethylene glycol, triethylene glycol, 4,4'-dihydroxyethoxy-diphenyldimethylmethane, hexanediol and formaldehyde. Suitable polyacetals can also be prepared by polymerization of cyclic acetals.

Useful polycarbonates having hydroxyl groups include those of the type known per se that can be prepared, for example, by reaction of diols such as propane-1,3-diol, butane-1,4-diol and/or hexane-1,6-diol, diethylene glycol, triethylene glycol or tetraethylene glycol with diaryl carbonates, e.g. diphenyl carbonate, alkylene carbonate or phosgene.

Polyester amides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines. Suitable polyether polyamines can be prepared from the abovementioned polyether polyols by known methods. Examples include the cyanoalkylation of polyoxyalkylene polyols and subsequent hydrogenation of the nitrile formed (U.S. Pat. No. 3 267 050) or the partial or complete amination of polyoxyalkylene polyols with amines or ammonia in the presence of hydrogen and catalysts (DE 12 15 373).

The rigid polyurethane foams of the invention can be produced with additional use of chain extenders and/or crosslinkers (E). However, the addition of chain extenders, crosslinkers or else optionally mixtures thereof may be found to be advantageous for modification of the mechanical properties, for example hardness.

Chain extenders and/or crosslinkers used are diols and/or triols having molecular weights of less than 400, preferably of 60 to 300. Useful examples of starter molecules include aliphatic, cycloaliphatic and/or araliphatic diols having 2 to 14, preferably 4 to 10, carbon atoms, for example ethylene glycol, propane-1,3-diol, decane-1,10-diol, o-, m-, p-dihydroxycyclohexane, diethylene glycol, dipropylene glycol and preferably butane-1,4-diol, hexane-1,6-diol and bis(2-hydroxyethyl)hydroquinone, triols such as 1,2,4-, 1,3,5-trihydroxycyclohexane, glycerol and trimethylolpropane and low molecular weight hydroxyl group-containing polyalkylene oxides based on ethylene oxide and/or 1,2-propylene oxide and the aforementioned diols and/or triols.

Useful further compounds (D) having at least two isocyanate-reactive groups, i.e. having at least two hydrogen atoms reactive with isocyanate groups, are especially those that have two or more reactive groups selected from OH groups, SH groups, NH groups, NH2 groups and CH-acidic groups, for example β-diketo groups.

If chain extenders, crosslinkers or mixtures thereof are employed for production of the rigid polyurethane foams, these are preferably used in an amount of 0% to 20% by weight, preferably of 0.5% to 5% by weight, based on the weight of component B).

Blowing agents (F) that are used for production of the rigid polyurethane foams preferably include water, formic acid and mixtures thereof. These react with isocyanate groups with formation of carbon dioxide and in the case of formic acid to give carbon dioxide and carbon monoxide. In addition, it is possible to use physical blowing agents such as low-boiling hydrocarbons and aromatic and aliphatic halogenated hydrocarbons. Suitable liquids are those which are inert with respect to the organic, optionally modified polyisocyanates and have boiling points below 100° C., preferably below 50° C., at atmospheric pressure, such that they evaporate under the influence of the exothermic polyaddition reaction.

Examples of such liquids that are usable with preference are alkanes such as heptane, hexane, n- and isopentane, preferably technical grade mixtures of n- and isopentanes, n- and isobutane and propane, cycloalkanes such as cyclopentane and/or cyclohexane, ethers such as furan, dimethyl ether and diethyl ether, ketones such as acetone and methyl ethyl ketone, alkyl carboxylates such as methyl formate, dimethyl oxalate and ethyl acetate, and halogenated hydrocarbons such as methylene chloride, dichloromonofluoromethane, difluoromethane, trifluoromethane, difluoroethane, tetrafluoroethane, chlorodifluoroethanes, 1,1-dichloro-2,2,2-trifluoroethane, 2,2-dichloro-2-fluoroethane and heptafluoropropane. It is also possible to use mixtures of these low-boiling-point liquids with one another and/or with other substituted or unsubstituted hydrocarbons. In addition, halogenated olefins can be used.

Further suitable compounds are organic carboxylic acids such as formic acid, acetic acid, oxalic acid, ricinoleic acid and compounds containing carboxyl groups.

Preference is given to using water, formic acid, all pentane isomers and mixtures thereof, and mixtures of at least two of these blowing agents, for example mixtures of water and cyclopentane and optionally formic acid.

The blowing agents have either been wholly or partly dissolved in the polyol component (i.e. B+C+D+E+F+G+H+I) or are metered in via a static mixer directly prior to the foaming of the polyol component.

The following are metered into the polyol component in situ: pentane, any portions of the chemical blowing agent, and a portion or the entirety of the catalysts, although the polyol component usually already contains at least proportions of these (except for pentane). The auxiliaries and additives, and also the flame retardants—if present—are preferably already present in the polyol blend.

The amount of the blowing agent or blowing agent mixture used is 1% to 45% by weight, preferably 1% to 30% by weight, more preferably 1.5% to 20% by weight, based in each case on the sum total of components B) to G).

If water serves as blowing agent, it is used in an amount of 0.2% to 5% by weight, based on formation components B, F, C, D, E, H, I, G and J.

The water may be present separately or in one of components B, F, C, D, E, H, I, G and J. The addition of water can be combined with the use of the other blowing agents described.

Catalysts (G) used for production of the rigid polyurethane foams are especially compounds that significantly accelerate the reaction of the compounds of component B) and optionally C) comprising reactive hydrogen atoms, especially hydroxyl groups, with the organic, optionally modified polyisocyanates A).

It is appropriate to use basic polyurethane catalysts, for example tertiary amines such as triethylamine, tributylamine, dimethylbenzylamine, dicyclohexylmethylamine, dimethylcyclohexylamine, N,N,N',N'-tetramethyldiaminodiethyl ether, bis(dimethylaminopropyl)urea, N-methyl and N-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, dimethylpiperazine, N-dimethylaminoethylpiperidine, 1,2-dimethylimidazole, 1-azabicyclo[2.2.0]octane, 1,4-diazabicyclo[2.2.2]octane (DABCO, synonym: triethylenediamine) and alkanolamine compounds such as triethanolamine, triisopropanolamine, N-methyl- and N-ethyldiethanolamine, dimethylaminoethanol, 2-(N,N-dimethylaminoethoxy)ethanol, N,N',N"-tris(dialkylaminoalkyl)hexahydrotriazine, e.g. N,N',N"-tris(dimethylaminopropyl)-s-hexahydrotriazine, 1,8-diazabicyclo[5.4.0]undec-7-ene. However, other suitable compounds are metal salts, for example iron(II) chloride, zinc chloride, lead octoate, and preferably tin salts, for example tin dioctoate, tin diethylhexoate, and dibutyltin dilaurate, and in particular mixtures of tertiary amines and of organotin salts.

Further important catalysts are carboxylates, frequently in the form of their potassium or ammonium salts, for example formate, acetate, octoate, or else in the zwitterionic form, for example in the form of substituted amino acids.

Further useful catalysts include: amidines such as 2,3-dimethyl-3,4,5,6-tetrahydropyrimidine, and alkali metal salts of long-chain fatty acids having 10 to 20 carbon atoms and optionally pendant OH groups. Preference is given to using 0.001% to 5% by weight, especially 0.05% to 2% by weight, of catalyst or catalyst combination, based on the weight of components B) to I). It is also possible to carry out the reactions without catalysis. In this case the catalytic activity of polyols started by means of amines is utilized. If a relatively large polyisocyanate excess is used in the foaming, useful catalysts for the trimerization reaction of the excess NCO groups with one another also include: isocyanurate group-forming catalysts, for example ammonium ions or alkali metal salts, alone or in combination with tertiary amines. Formation of isocyanurate leads to flame-retardant PIR foams which are preferably used in rigid foam for technical applications, for example in the construction industry as insulation sheet or sandwich elements.

Further details regarding the starting materials mentioned and others can be found in the technical literature, for example in Kunststoffhandbuch [Plastics Handbook], Volume VII, Polyurethane [Polyurethanes], Carl Hanser Verlag, Munich, Vienna, 1st, 2nd and 3rd editions, 1966, 1983 and 1993.

It is also optionally possible to add further auxiliaries and/or additives (H) to the reaction mixture for the production of the rigid polyurethane foams. Examples include surface-active substances, foam stabilizers, cell regulators, fillers, dyes, pigments, flame retardants, hydrolysis stabilizers, and fungistatic and bacteriostatic substances.

Examples of surface-active substances that can be used are compounds which serve to support homogenization of the starting materials and which optionally are also suitable for regulating the cell structure of the plastics. Examples include emulsifiers such as the sodium salts of castor oil sulfates or of fatty acids, and salts of fatty acids with amines, for example diethylamine oleate, diethanolamine stearate, diethanolamine ricinoleate, salts of sulfonic acids, for example alkali metal or ammonium salts of dodecylbenzene- or dinaphthylmethanedisulfonic acid and ricinoleic acid; foam stabilizers such as siloxane-oxyalkylene copolymers and other organopolysiloxanes, ethoxylated alkylphenols, ethoxylated fatty alcohols, paraffin oils, castor oil esters or ricinoleic esters, Turkey red oil and peanut oil, and cell regulators such as paraffins, fatty alcohols and dimethylpolysiloxanes. Other materials suitable for improving emulsifying action and cell structure and/or foam stabilization are the oligomeric acrylates described above having, as pendant groups, polyoxyalkylene moieties and fluoroalkane moieties. The surface-active substances are typically employed in amounts of 0.01% to 10% by weight, based on 100% by weight of component B). Fillers, in particular reinforcing fillers, are understood to mean the customary organic and inorganic fillers, reinforcers, weighting agents, agents for improving abrasion behavior in paints, coating compositions etc., these being known per se.

Specific examples include: inorganic fillers such as siliceous minerals, for example sheet silicates such as antigorite, serpentine, hornblendes, amphiboles, chrysotile, talc, metal oxides such as kaolin, aluminum oxides, titanium oxides and iron oxides, metal salts such as chalk, barite and inorganic pigments such as cadmium sulfide and zinc sulfide, and glass inter alia. Preference is given to using kaolin (china clay), aluminum silicate and coprecipitates of barium sulfate and aluminum silicate and also natural and synthetic fibrous minerals such as wollastonite, metal fibers and in particular glass fibers of various lengths which may optionally have been sized. Examples of useful organic fillers include: carbon, melamine, rosin, cyclopentadienyl resins and graft polymers, and also cellulose fibers, polyamide fibers, polyacrylonitrile fibers, polyurethane fibers and polyester fibers derived from aromatic and/or aliphatic dicarboxylic esters, and in particular carbon fibers.

The inorganic and organic fillers may be used individually or as mixtures and are advantageously incorporated into the reaction mixture in amounts of 0.5% to 50% by weight, preferably 1% to 40% by weight, based on the weight of components A) to C), although the content in mats and nonwoven and woven fabrics made of natural and synthetic fibers can reach values of up to 80% by weight.

Flame retardants (I) used may generally be the flame retardants known from the prior art. Examples of suitable flame retardants are non-incorporable brominated substances, brominated esters, brominated ethers (Ixol) and brominated alcohols such as dibromoneopentyl alcohol, tribromoneopentyl alcohol and PHT-4-diol, and also chlorinated phosphates, for example tris(2-chloroethyl) phosphate, tris(2-chloropropyl) phosphate, tris(1,3-dichloropropyl) phosphate, tricresyl phosphate, tris(2,3-dibromopropyl) phosphate, tetrakis(2-chloroethyl) ethylenediphosphate, dimethyl methanephosphonate, diethyl diethanolaminomethylphosphonate, and also commercially available halogenated flame-retardant polyols.

Further liquid flame retardants used may be phosphates or phosphonates, such as diethylethane phosphonate (DEEP), triethyl phosphate (TEP), dimethyl propyl phosphonate (DMPP), diphenyl cresyl phosphate (DPK) and others.

Apart from the abovementioned flame retardants, it is also possible to use inorganic or organic flame retardants such as red phosphorus, preparations comprising red phosphorus, aluminum oxide hydrate, antimony trioxide, arsenic oxide, ammonium polyphosphate and calcium sulfate, expandable graphite or cyanuric acid derivatives, e.g. melamine, or mixtures of at least two flame retardants, e.g. ammonium polyphosphates and melamine, and also optionally maize starch or ammonium polyphosphate, melamine and expandable graphite and/or optionally aromatic polyesters to render the rigid polyurethane foams flame-retardant. In general, it has been found to be appropriate to use 1% to 70% by weight, preferably 5% to 40% by weight, more preferably 10% to 30% by weight, of the flame retardants mentioned, based on the polyol system (i.e. components B+C+D+E+F+G+H+I).

Further details relating to the abovementioned other customary auxiliaries and additives can be inferred from the technical literature, for example the monograph by J. H. Saunders and K. C. Frisch "High Polymers" volume XVI, Polyurethanes, parts 1 and 2, Verlag Interscience Publishers 1962 and 1964, or the Kunststoff-Handbuch [Plastics Handbook], Polyurethane [Polyurethanes], volume VII, Hanser-Verlag, Munich, Vienna, 1st and 2nd editions, 1966 and 1983.

The rigid polyurethane foams obtainable by the abovementioned processes and the components defined above likewise form part of the subject matter of the present invention.

The corresponding rigid polyurethane foams may be used here for thermal insulation in cooling equipment (refrigerators) and in the construction industry.

In this context, in the production of the rigid polyurethane foams, it should be ensured that rigid polyurethane foams for use in the construction sector and rigid polyurethane foams for cooling systems typically comprise flame retardants.

The invention further relates to the use of the polyester polyols of the invention in thermoplastic polyurethanes by reaction of a polyester polyol prepared by the process of the invention with one or more organic diisocyanates (or polyisocyanates) that have already been described in previous remarks.

The polyurethanes can in principle be prepared by the known processes, in batchwise or continuous mode, for example with reactive extruders or by the "one-shot" belt process or by the prepolymer process (including multistage prepolymer processes; see U.S. Pat. No. 6,790,916 for example), but preferably by the "one-shot" process. In these processes, the components to be reacted [polyester polyols, chain extenders, isocyanates and optionally auxiliaries and additives (especially UV stabilizers)] can be mixed successively or simultaneously with one another, with immediate onset of the reaction.

The polyurethane which is obtained from a polyester polyol produced by the process of the invention is especially a thermoplastic polyurethane. Thermoplastic polyurethanes are also called TPUs hereinafter.

TPUs can be produced by the methods known to the person skilled in the art.

The present invention further relates to a shaped body, a film, a hose or tube, for example bicycle inner tube, or a fiber produced from a thermoplastic polyurethane based on the polyester polyol of the invention.

TPUs can be produced by the methods known to the person skilled in the art.

Illustrative embodiments of the present invention are listed below, but these do not restrict the present invention. In particular, the present invention also encompasses those embodiments which result from the dependency references and hence combinations specified hereinafter:

1. A polyester polyol comprising the esterification product of
   a. at least one dicarboxylic acid component A), where the dicarboxylic acid component A) comprises
   b. at least one disulfide-containing dicarboxylic acid a-1; and
   c. a polyol component (K) comprising
      i. at least one diol (D), where the diol (D) comprises
      ii. at least one diol b-1 selected from the group consisting of cyclohexanedimethanol, hexane-1,6-diol.
2. The polyester polyol according to embodiment 1, wherein the dicarboxylic acid component A) additionally comprises a non-sulfur-containing dicarboxylic acid a-2.
3. The polyester polyol according to embodiment 1, wherein the non-sulfur-containing dicarboxylic acid a-2 is terephthalic acid.
4. The polyester polyol according to embodiment 1 or 2, wherein the dicarboxylic acid component A) comprises
   a. 50 to 100 mol % of at least one disulfide-containing dicarboxylic acid a-1; and
   b. 0-50 mol % of a non-sulfur-containing dicarboxylic acid a-2,
   where the sum total of the molar percentages of components a-1 and a-2 in the dicarboxylic acid component A) is 100 mol %.
5. The polyester polyol according to any of embodiments 1 to 4, wherein the diol (D) comprises a further diol b-2.
6. The polyester polyol according to embodiment 5, wherein the further diol b-2 is selected from the group consisting of ethylene glycol, diethylene glycol, propane-1,2-diol, propane-1,3-diol, monopropylene glycol, dipropylene glycol, butane-1,4-diol, pentane-1,5-diol.
7. The polyester polyol according to either of embodiments 5 and 6, wherein the diol D) comprises
   a. 10 mol % to 100 mol % of diol b-1
   b. 0 mol % to 90 mol % of diol b-2,
   where the sum total of the molar percentages of components b-1 and b-2 is 100 mol %.
8. The polyester polyol according to any of embodiments 1 to 7, wherein the polyol component (K) comprises the diol (D) and at least one polyhydric alcohol C) having a functionality greater than 2.
9. The polyester polyol according to embodiment 8, wherein the polyol component (K) comprises
   a. 10 to 100 mol % of the diol (D); and
   b. 0 to 90 mol % of at least one polyhydric alcohol C) having a functionality greater than 2,
   where the sum total of the molar percentages of D and C is 100 mol %.
10. The polyester polyol according to embodiment 8, wherein the polyol component (K) comprises
    a. 60 to 99.9 mol % of the diol (D); and
    b. 0.1 to 40 mol % of at least one polyhydric alcohol C) having a functionality greater than 2,
    where the sum total of the molar percentages of D and C is 100 mol %.
11. The polyester polyol according to embodiment 8, wherein the polyol component (K) comprises
    a. 90 to 99.5 mol % of the diol (D); and
    b. 0.5 to 10 mol % of at least one polyhydric alcohol C) having a functionality greater than 2,
    where the sum total of the molar percentages of D and C is 100 mol %.
12. The polyester polyol according to any of embodiments 1 to 11, which comprises
    a. 45-50 mol % of the dicarboxylic acid component A) and
    b. 50-55% of a polyol component (K),
    where the sum total of the molar percentages of A and K is 100 mol %.
13. The polyester polyol according to any of embodiments 1 to 12, wherein at least one of the disulfide-containing dicarboxylic acids a-1) is selected from the group consisting of aliphatic disulfide-containing dicarboxylic acids.
14. The polyester polyol according to any of embodiments 1 to 12, wherein the disulfide-containing dicarboxylic acid a-1) is an aliphatic disulfide-containing dicarboxylic acid.
15. The polyester polyol according to embodiment 14, wherein at least one of the disulfide-containing dicarboxylic acids a-1) is selected from the group consisting of 2-(carboxymethyldisulfanyl)acetic acid, 3-(2-carboxyethyldisulfanyl)propanoic acid, 4-(3-carboxypropyldisulfanyl)butanoic acid, 2-[(2-carboxyphenyl)disulfanyl]benzoic acid and their alkyl esters, preferably dimethyl and diethyl esters, or mixtures of the aforementioned acids.
16. The polyester polyol according to embodiment 14, wherein the disulfide-containing dicarboxylic acid a-1) is selected from the group consisting of 2-(carboxymethyldisulfanyl)acetic acid, 3-(2-carboxyethyldisulfanyl)propanoic acid, 4-(3-carboxypropyldisulfanyl)butanoic acid and their alkyl esters, preferably dimethyl and diethyl esters, or mixtures of the aforementioned acids.
17. The polyester polyol according to embodiment 14, the disulfide-containing dicarboxylic acid a-1) is 3-(2-carboxyethyldisulfanyl)propanoic acid.
18. The polyester polyol according to any of embodiments 8 to 17, wherein the polyhydric alcohol C) is selected from the group consisting of glycerol, trimethylolpropane (TMP), pentaerythritol, reaction products thereof with an alkylene oxide, and mixtures thereof.
p0 19. The polyester polyol according to any of embodiments 8 to 17, wherein the polyhydric alcohol C) is selected from the group consisting of TMP and the reaction product of TMP with ethylene oxide.
20. A process for preparing a polyester polyol according to any of embodiments 1 to 19 by reaction of component D) with component K).
21. The process for preparing a polyester polyol according to embodiment 20, wherein no additional catalyst is used during the reaction.

22. A process for preparing a polyester polyol according to any of embodiments 1 to 19, wherein no polyhydric alcohol C) is used.
23. A process for preparing a polyester polyol according to any of embodiments 1 to 19, wherein the reaction is conducted at a temperature in the range from 150 to 220° C.
24. A process for preparing a polyester polyol according to any of embodiments 1 to 19, wherein the reaction is conducted at a temperature in the range from 160 to 190° C.
25. A process for preparing a polyester polyol according to any of embodiments 20 to 24, wherein the reaction is first conducted
    a. at standard pressure up to an acid number of 80 to 20 mg KOH/g—determined to DIN EN 1241, and then continued
    b. at a pressure of less than 500 mbar up to an acid number of less than 10 mg KOH/g.
26. The process for preparing a polyester polyol according to embodiment 25, wherein the reaction is first conducted at standard pressure up to an acid number of 40 to 20 mg KOH/g.
27. The process for preparing a polyester polyol according to any of embodiments 25 to 21, wherein step b is conducted at a pressure of 40 to 400 mbar.
28. The process for preparing a polyester polyol according to any of embodiments 25 to 22, wherein the reaction in step b is continued up to an acid number of less than 2 mg KOH/g.
29. The process for preparing a polyester polyol according to any of embodiments 25 to 23, wherein the reaction is conducted under an inert atmosphere.
30. A process for producing a rigid polyurethane foam by converting a reaction mixture comprising
    a. organic and/or modified organic di- and/or polyisocyanates with
    b. at least one polyester polyol according to any of embodiments 1 to 19,
    c. one or more blowing agents and
    d. catalysts.
31. The process according to embodiment 30, wherein the reaction mixture additionally comprises further polyester polyols and/or polyether polyols.
32. The process according to either of embodiments 30 and 31, wherein the reaction mixture additionally comprises further polyetherols and/or further compounds having at least two isocyanate-reactive groups.
33. The process according to any of embodiments 30 to 32, wherein the reaction mixture additionally comprises chain extenders and/or crosslinkers.
34. The process according to any of embodiments 30 to 33, wherein the reaction mixture additionally comprises chain extenders and flame retardants.
35. A rigid polyurethane foam obtainable by a process according to embodiments 30 to 34.
36. The use of polyester polyol according to any of embodiments 1 to 19 for production of a rigid polyurethane foam.

The examples that follow serve to illustrate the invention, but are in no way limiting with regard to the subject matter of the present invention.

EXAMPLES

The examples below are intended to illustrate some aspects of the present invention. The examples are in no way intended to restrict the scope of the invention.

Methods

Viscosity determination:

Unless stated otherwise, the viscosity of the polyols was determined at 25° C. to DIN EN ISO 3219 (October 1994) with a Rheotec RC 20 rotary viscometer using the CC 25 DIN spindle (spindle diameter: 12.5 mm; internal measuring cylinder diameter: 13.56 mm) at a shear rate of 50 1/s.

Measurement of hydroxyl number:

Hydroxyl numbers were determined by the phthalic anhydride method DIN 53240 (December 1971) and reported in mg KOH/g.

Measurement of acid number:

Acid number was determined to DIN EN 1241 (May 1998) and is reported in mg KOH/g.

Permeability measurement on polyurethane films

The permeability of polyurethane films was determined against 4 gases in each case. Transmissions against nitrogen, methane and carbon dioxide were measured with a Brugger gas permeability tester according to ASTM D 1434 82 (1982 original, 2015 rev.). The measurement area is 78 $cm^2$. Oxygen permeability was determined in a Mocon Oxtran 2/21 according to ASTM D 3985 (2005 orig., 2010 rev.). The measurement area here is 50 $cm^2$.

Water permeability was determined according to ASTM F-1249 (2013 original).

Inventive Example 1

A 2 l round-neck flask equipped with thermometer, nitrogen inlet, heating mantle, distillation column and stirrer was charged with 565.3 g of 3-(2-carboxyethyldisulfanyl)propanoic acid and 531.6 g of cyclohexanedimethanol and heated to 120° C. In the course of further heating to 140° C., water forms on attainment of a temperature of 135° C. and is removed by distillation. Once 80% of the water of condensation calculated has been removed, the pressure in the apparatus is reduced to 60 mbar and the mixture is heated further until an acid number of less than 2 mg KOH/g is attained. A polyester polyol is obtained with a hydroxyl number of 111 mg KOH/g, an acid number of 1.17 mg KOH/g and a viscosity of 1719 mPas at 75° C.

Inventive Example 2

A 4 l round-neck flask equipped with thermometer, nitrogen inlet, heating mantle, distillation column and stirrer was charged with 1557 g of 3-(2-carboxyethyldisulfanyl)propanoic acid, 1127 g of cyclohexanedimethanol and 82.8 g of trimethylolpropane and heated to 120° C. In the course of further heating up to 210° C., the water of condensation formed is distilled off continuously until an acid number of less than 2 mg KOH/g has been attained. The reaction affords a polyester polyol with a hydroxyl number of 61.5 mg KOH/g, an acid number of 0.6 mg KOH/g and a viscosity of 13,090 mPas at 75° C.

Inventive Example 3

A 4 l round-neck flask equipped with thermometer, nitrogen inlet, heating mantle, distillation column and stirrer was charged with 1563 g of 3-(2-carboxyethyldisulfanyl)propanoic acid, 1127 g of cyclohexanedimethanol and 77.4 g of trimethylolpropane and heated to 120° C. In the course of further heating up to 210° C., the water of condensation formed is distilled off continuously until an acid number of less than 2 mg KOH/g has been attained. The reaction affords a polyester polyol with a hydroxyl number of 55.5 mg KOH/g, an acid number of 0.526 mg KOH/g and a viscosity of 16,540 mPas at 75° C.

cl Inventive Example 4

A 4 l round-neck flask equipped with thermometer, nitrogen inlet, heating mantle, distillation column and stirrer was charged with 1317 g of 3-(2-carboxyethyldisulfanyl)propanoic acid, 1211.7 g of cyclohexanedimethanol and 197 g of glycerol and heated to 120° C. In the course of further heating up to 210° C., the water of condensation formed is distilled off continuously until an acid number of less than 2 mg KOH/g has been attained. The reaction affords a polyester polyol with a hydroxyl number of 234.5 mg KOH/g, an acid number of 0.028 mg KOH/g and a viscosity of 807 mPas at 75° C.

Comparative Example 1

A 4 l round-neck flask equipped with thermometer, nitrogen inlet, heating mantle, distillation column and stirrer was charged with 1230 g of adipic acid and 1605 g of cyclohexanedimethanol and heated to 120° C. After addition of 1 ppm of titanium tetrabutoxide as catalyst, the mixture is stirred and heated to 240° C., with continuous removal of water released by distillation. Once 80% of the calculated water of reaction has been removed, a vacuum of 60 mbar is applied and the reaction is continued until an acid number of less than 2 mg KOH/g is measured. The polyester polyol obtained had a hydroxyl number of 114.8 mg KOH/g, an acid number of <0.1 mg KOH/g and a viscosity of 420 mPas at 100° C.

Comparative Example 2

A 4 l round-neck flask equipped with thermometer, nitrogen inlet, heating mantle, distillation column and stirrer was charged with 1660 g of adipic acid and 1249 g of butanediol and heated to 120° C. After addition of 1 ppm of titanium tetrabutoxide as catalyst, the mixture is stirred and heated to 240° C., with continuous removal of water released by distillation. Once 80% of the calculated water of reaction has been removed, a vacuum of 60 mbar is applied and the reaction is continued until an acid number of less than 2 mg KOH/g is measured. The polyester polyol obtained had a hydroxyl number of 56 mg KOH/g, an acid number of 0.6 mg KOH/g and a viscosity of 670 mPas at 75° C.

Use example 1—production of TPU films

Polyester polyols produced in inventive example 1 and comparative example 2 were used to produce TPUs and processed to give flat films. The TPUs were produced by methods known to the person skilled in the art. The flat films were produced on a 30 mm Arenz with a three-zone screw with a mixing section (screw ratio 1:3) and a 250 mm slot die.

The films obtained were examined for their permeability properties as described under "Permeability measurement". (In the tables below, "E" means to the power of ten.)

TABLE 1

Use of the PESOL of the invention

| Material | Film thickness in μm | Gas | Transmission rate $cm^3/m^2/d$ at 23° C., dry | Permeability $cm^3 \cdot 1\ \mu m/m^2/d/bar$ at 23° C., dry |
|---|---|---|---|---|
| TPU film (inv. example 1) | 220.3 +/− 7.8 | nitrogen | 3.19E+01 | 7.75E+03 |
| TPU film (inv. example 1) | 220.3 +/− 7.8 | carbon dioxide | 3.31E+02 | 8.06E+04 |
| TPU film (inv. example 1) | 220.3 +/− 7.8 | methane | 5.82E+01 | 1.41E+04 |
| TPU film (inv. example 1) | 220.3 +/− 7.8 | oxygen | 1.2E+02 | 2.91E+04 |
| TPU film (inv. example 1) | 220.3 +/− 7.8 | water | 1.99E+01 | 4.69E+03 |

TABLE 2

Use of a comparative PESOL

| Material | Film thickness in μm | Gas | Transmission rate $cm^3/m^2/d$ at 23° C., dry | Permeability $cm^3 \cdot 1\ \mu m/m^2/d/bar$ at 23° C., dry |
|---|---|---|---|---|
| TPU film (comparative example 2) | 40 | nitrogen | 3.83E+02 | 1.53E+04 |
| TPU film (comparative example 2) | 40 | carbon dioxide | 9.24E+03 | 3.70E+05 |
| TPU film (comparative example 2) | 40 | methane | 9.07E+02 | 3.63E+04 |
| TPU film (comparative example 2) | 40 | oxygen | 1.38E+03 | 5.53E+04 |
| TPU film (comparative example 2) | 40 | water | 2.13E+02 | 8.58E+03 |

It can be seen from the permeability measurements presented above that flat TPU films based on polyesterols without dithiodipropionic acid have distinctly higher permeability with respect to the gases tested.

This is associated with elevated thermal conductivity of those polyurethane systems that are not based on the sulfur-containing PESOLs of the invention.

Further use examples: production of rigid polyurethane foams for thermal insulation For production of the rigid polyurethane foams of the invention on the laboratory scale, the components of comparative examples X and Y and of inventive examples A and B that are listed in tables 3 and 4 are mixed in the ratios specified at 20'C. The reaction mixture either remains in the mixing vessel (beaker) or is transferred into an open cubic mold of dimensions 22×22×22 cm in which the foam rises freely. Test specimens for determination of thermal conductivity (TC), compressive strength and closed-cell content were taken from the cubic foam block. Cell size and cell gas content were determined from beaker foams.

TABLE 3

|  | Comparative example X | Inventive example A |
|---|---|---|
| Polyol 1 | 78 | 58.5 |
| Polyol 2 |  | 19.5 |
| Polyol 3 |  |  |
| Polyol 4 | 8 | 8 |
| Additives | 18.6 | 18.6 |
| Formic acid | 1.2 | 1.2 |
| Pentane | 13.5 | 13.5 |
| Polyol component, pts. by wt. | 119.3 | 119.3 |
| Isocyanate component, pts. by wt. | 298.3 | 257.9 |
| Mechanical properties/analysis |  |  |
| Fiber time [s] | 52 | 49 |
| Free-foamed envelope density [g/L] | 50.5 | 44.9 |
| TC [mW/mK] after 24 h to DIN EN 12667 | 21.7 | 20.9 |
| TC [mW/mK] after 21 d, 70° C. to DIN EN 12667 | 26.7 | 25.3 |
| Compressive strength at 40 g/L [N/mm2] to DIN EN ISO 844 | 0.170 | 0.164 |
| Cell sizes [µm] | — | — |
| Closed-cell content [%] to DIN EN ISO 4590 | 91 | 93 |
| Cell gases [% by vol.] Air/CO/CO$_2$/pentane |  |  |
| 1 d | 10/8/35/47 | 3/8/37/52 |
| 28 d | 43/6/16/35 | 25/8/26/40 |

TABLE 4

|  | Comparative example Y | Inventive example B |
|---|---|---|
| Polyol 1 | 77 | 27 |
| Polyol 2 |  |  |
| Polyol 3 |  | 50 |
| Polyol 4 | 7.8 | 7.8 |
| Additives | 18.8 | 19.2 |
| Formic acid | 1.4 | 1.55 |
| Pentane | 14 | 14 |
| Polyol component, pts. by wt. | 119.0 | 120.8 |
| Isocyanate component, pts. by wt. | 225.5 | 226.6 |
| Mechanical properties/analysis |  |  |
| Fiber time [s] | 50 | 52 |
| Free-foamed envelope density [g/L] | 39.8 | 40.5 |
| TC [mW/mK] after 24 h to DIN EN 12667 | 21.8 | 20.7 |
| TC [mW/mK] after 21 d, 70° C. to DIN EN 12667 | 26.3 | 25.1 |
| Compressive strength at 40 g/L [N/mm2] to DIN EN ISO 844 | 0.172 | 0.184 |
| Cell sizes [µm] | 198 | 204 |
| Closed-cell content [%] to DIN EN ISO 4590 | 92 | 91 |

Polyol 1: Polyester polyol based on terephthalic acid, diethylene glycol, $C_{18}$ fatty acid and alkoxylated glycerol, OH number 240 mg KOH/g.

Polyol 2: Polyester polyol based on 3,3'-dithiodipropionic acid, cyclohexanedimethanol and trimethylolpropane, OH number 55 mg KOH/g.

Polyol 3: Polyester polyol based on 3,3'-dithiodipropionic acid, cyclohexanedimethanol and glycerol, OH number 235 mg KOH/g.

Polyol 4: Polyether polyol based on diethylene glycol and ethylene oxide, OH number 190 mg KOH/g.

Additives: Mixture of tris(1-chloro-2-propyl) phosphate flame retardant, a silicone-based copolymer from Evonik Goldschmidt as foam stabilizer and a catalyst mixture consisting of a formate salt and a tertiary amine.

Isocyanate: Polymeric MDI with an NCO content of 31.5% by weight.

Thermal conductivity is determined with an EP500e λ-meter from Lambda Messtechnik GmbH Dresden at an average temperature of 10° C. on PU specimens of dimensions 200×200×50 mm that were taken from the above-described cubic foam block 24 hours after its production. To determine the cell size, a specimen of about 10×10×10 cm in size is taken from the interior of a beaker foam. For the measurement, a clean cut surface perpendicular to the direction of rising of the foam is produced and contrasted with soot spray. This is then followed by the imaging of the cut surface with a light microscope and evaluation with the PORE!SCAN software from Goldlücke. This generates a size class distribution of the cells and the arithmetic average over the area.

The cell gases are determined by the method of M. Svanström and O. Ramnäs described in the Journal of Cellular Plastics, vol. 31, 1995, pages 375-388, in which a gas sample from the foam interior is taken with a brass syringe from the intact beaker foams under an inert gas atmosphere.

Tables 3 and 4 show examples in which the inventive polyols 2 and 3 replace the polyol 1 in different proportions in the A component of a representative PIR formulation. Both examples show that the use of the polyols of the invention lowers the thermal conductivity of the foam after 24 hours and after aging at 70° C. for 21 days. In addition, the compressive strength in the case of replacement of 50 parts by weight of polyol 1 by polyol 3 improves by 7%. The improvement in thermal conductivities can be explained by the slower exchange mainly of $CO_2$ for air in the foam cells. These results confirm the results of the permeability measurements on TPU films from tables 1 and 2.

It is apparent from these further use examples that, in the case of use of the polyester polyols of the invention, it is possible to reduce thermal conductivity in the resulting polyurethanes before and after aging.

Formulae

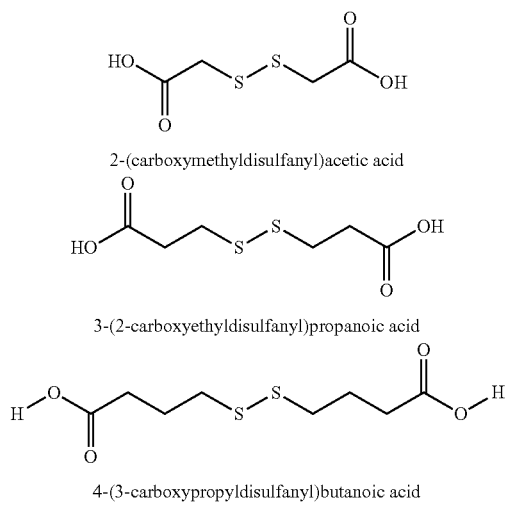

2-(carboxymethyldisulfanyl)acetic acid 3-(2-carboxyethyldisulfanyl)propanoic acid 4-(3-carboxypropyldisulfanyl)butanoic acid

The invention claimed is:

1. A polyester polyol, comprising an esterification product of:
   at least one dicarboxylic acid component A), wherein the at least one dicarboxylic acid component A) comprises at least one disulfide-containing dicarboxylic acid a-1); and
   a polyol component K) comprising at least one diol D), wherein the at least one diol D) comprises at least one diol b-1)
      selected from the group consisting of cyclohexanedimethanol and hexane-1,6-diol,
   wherein the at least one dicarboxylic acid component A) additionally comprises a non-sulfur-containing dicarboxylic acid a-2).

2. The polyester polyol of claim 1, wherein the at least one dicarboxylic acid component A) additionally comprises terephthalic acid.

3. The polyester polyol of claim 1, wherein the at least one diol D) additionally comprises a further diol b-2).

4. The polyester polyol of claim 1, wherein the polyol component K) additionally comprises at least one polyhydric alcohol C) having a functionality greater than 2.

5. The polyester polyol of claim 1, wherein at least one of the at least one disulfide-containing dicarboxylic acid a-1) is an aliphatic disulfide-containing dicarboxylic acid.

6. The polyester polyol of claim 5, wherein the at least one disulfide-containing dicarboxylic acid a-1) is 3-(2-carboxyethyldisulfanyl)propanoic acid.

7. The polyester polyol of claim 4, wherein the at least one polyhydric alcohol C) is selected from the group consisting of glycerol, trimethylolpropane (TMP), pentaerythritol, reaction products thereof with an alkylene oxide, and mixtures thereof.

8. A process for preparing the polyester polyol of claim 1, the processing comprising:
   reacting the at least one dicarboxylic acid component A) with the polyol component K).

9. The process of claim 8, wherein no additional catalyst is used during the reaction.

10. A process for preparing the polyester polyol of claim 1, the process comprising:
    reacting the at least one dicarboxylic acid component A) with the polyol component K), to obtain the esterification product,
    wherein the reacting is first conducted
    at standard pressure up to an acid number of 80 to 20 mg KOH/g, determined
    according to DIN EN 1241, and then continued
    at a pressure of less than 500 mbar up to an acid number of less than 10 mg KOH/g.

11. A process for producing a rigid polyurethane foam, the process comprising reacting
    a reaction mixture comprising an organic and/or modified organic di- and/or polyisocyanate with
    at least one polyester polyol of claim 1, one or more blowing agents and a catalyst.

12. The process of claim 11, wherein the reaction mixture additionally comprises a further polyester polyol and/or a polyether polyol.

* * * * *